(12) United States Patent
Palmieri

(10) Patent No.: US 9,546,109 B2
(45) Date of Patent: Jan. 17, 2017

(54) METHOD FOR PERFORMING A FRIT FIRING CYCLE IN THE MANUFACTURING OF A VACUUM SOLAR THERMAL PANEL

(75) Inventor: Vittorio Palmieri, Geneva (CH)

(73) Assignee: TVP SOLAR SA, Geneva (CH)

( * ) Notice: Subject to any disclaimer, the term of this patent is extended or adjusted under 35 U.S.C. 154(b) by 204 days.

(21) Appl. No.: 13/977,273

(22) PCT Filed: Dec. 15, 2011

(86) PCT No.: PCT/EP2011/006339
§ 371 (c)(1),
(2), (4) Date: Dec. 18, 2013

(87) PCT Pub. No.: WO2012/089311
PCT Pub. Date: Jul. 5, 2012

(65) Prior Publication Data
US 2014/0345329 A1    Nov. 27, 2014

(30) Foreign Application Priority Data
Dec. 28, 2010   (EP) ..................................... 10197200

(51) Int. Cl.
*C03C 27/04*      (2006.01)
*C03C 23/00*      (2006.01)
(Continued)

(52) U.S. Cl.
CPC .............. *C03C 27/04* (2013.01); *C03C 23/001* (2013.01); *C03C 23/007* (2013.01);
(Continued)

(58) Field of Classification Search
CPC ...... C03C 27/04; C03C 27/042; C03C 27/044; C03C 27/046; F24J 2/507; F24J 2/4645; F24J 2/465; Y02E 10/40
(Continued)

(56) References Cited

U.S. PATENT DOCUMENTS 3,282,669 A  *  11/1966  Pinkham et al. ............... 65/59.2
3,660,064 A  *   5/1972  Rohde .......................... 65/59.28
(Continued)

FOREIGN PATENT DOCUMENTS

WO    WO2010/003653 A2    1/2010
WO    WO2010003653       *  1/2010  ................. F24J 2/50
(Continued)

OTHER PUBLICATIONS

European Patent Office, "International Search Report", in PCT/EP2011/006339, dated May 8, 2012, 51 pages.

*Primary Examiner* — Jodi C Franklin
(74) *Attorney, Agent, or Firm* — Hickman Palermo Becker Bingham LLP

(57) ABSTRACT

The present application relates to a method for manufacturing a vacuum solar thermal panel which comprises at least a tempered glass plate and a metal frame attached to said plate, the method comprising a frit firing cycle to form a glass-metal seal, the frit firing cycle comprising a first heating phase of the tempered glass plate up to a maximum temperature (Tm), being the temperature which preserves a suitable pre-stress level of the tempered glass plate. Advantageously according to the invention, the method further comprises a second heating phase (via optical radiation illumination) being a selective heating phase of a melting area of the tempered glass plate performed at a second temperature (Th) which is above the maximum temperature (Tm).

9 Claims, 5 Drawing Sheets

(51) Int. Cl.
*F24J 2/46* (2006.01)
*F24J 2/50* (2006.01)

(52) U.S. Cl.
CPC ............ *C03C 27/044* (2013.01); *F24J 2/465* (2013.01); *F24J 2/4645* (2013.01); *F24J 2/507* (2013.01); *Y02E 10/40* (2013.01)

(58) Field of Classification Search
USPC ........................................................ 65/154
See application file for complete search history.

(56) References Cited

U.S. PATENT DOCUMENTS

| | | | | |
|---|---|---|---|---|
| 4,095,428 | A | * | 6/1978 | Warren .................. 60/641.8 |
| 4,423,718 | A | * | 1/1984 | Garrison .................. 126/655 |
| 4,493,940 | A | * | 1/1985 | Takaoka .................. 136/248 |
| 2007/0170839 | A1 | * | 7/2007 | Choi et al. .................. 313/500 |
| 2008/0124558 | A1 | * | 5/2008 | Boek .................. C03C 3/066 |
| | | | | 428/427 |
| 2009/0297861 | A1 | | 12/2009 | Banks |
| 2010/0006090 | A1 | * | 1/2010 | Palmieri .................. 126/704 |
| 2011/0174297 | A1 | * | 7/2011 | Palmieri .................. 126/653 |
| 2013/0236662 | A1 | * | 9/2013 | Dua et al. .................. 428/34 |
| 2014/0299256 | A1 | * | 10/2014 | Sridharan et al. ............ 156/109 |
| 2014/0345329 | A1 | * | 11/2014 | Palmieri .................. 65/34 |

FOREIGN PATENT DOCUMENTS

| | | |
|---|---|---|
| WO | WO2012/089311 A1 | 7/2012 |
| WO | WO2012/089311 A8 | 7/2012 |

\* cited by examiner

METHOD FOR PERFORMING A FRIT FIRING CYCLE IN THE MANUFACTURING OF A VACUUM SOLAR THERMAL PANEL

FIELD OF APPLICATION

The present invention relates to a method for performing a frit firing cycle in the manufacturing of a vacuum solar thermal panel.

PRIOR ART

As it is well known, vacuum solar thermal panels comprise at least a flat vacuum tight envelope comprising a glass plate transparent to visible solar radiation and attached to a metal peripheral frame. Inside the vacuum envelope are disposed heat absorbers and a pipe entering and exiting the envelope connected to the heat absorbers.

The solar radiation thus enters the envelope through the glass plate, is absorbed by the heat absorbers and converted into heat and the converted heat is transferred to the pipe and to a heat transfer fluid flowing in the pipe.

Vacuum is kept inside the vacuum envelope enclosing the heat absorbers and part of the pipe connected to them, in order to prevent heat from escaping to the external environment through convection.

A vacuum solar thermal panel of the known type is described for instance in the PCT application published under No. WO 2010/003653 in the name of the same Applicant.

It is known that vacuum solar thermal panels require tempered glass plates to resist atmospheric pressure and accidental impacts, for instance hail impact.

The tempered glass plates are attached to metal frames by means of a frit enabled glass-metal seal. To obtain this aim, tempered glass plates undergo thermal cycles during the manufacturing of vacuum solar thermal panels. Such thermal cycles can reach temperatures as high as 500° C. to allow melting of such a glass frit.

However, it is also well known that a prolonged exposure to high temperature reduces the pre-stress of tempered glass plates.

For example, a frit firing cycle peaking at a temperature of about 450° C. for about 30 minutes, provides a pre-stress reduction in the order of 30% for a 5 mm thick float glass plate.

The reduction in the average rupture stress load in a thick float glass subject to various thermal cycles is shown in FIG. 1, as a result of experiments carried out by the Applicant using a 5 mm thick float glass.

It should be noted that a tempered glass breaks when the applied stress is due to mechanical deformation and approaches the pre-stress value. As a general rule for tempered glass, stress due to mechanical deformation should be less than half the pre-stress induced by the tempering process.

In FIG. 2, it is reported that the atmospheric pressure induces stress in a glass plate as a function of the support structure point contacts pitch for two different glass plate thicknesses. FIG. 2 reports result of experiments carried out by the Applicant using a 5 mm and a 4 mm thick float glass, respectively.

Hence, a significant reduction of the pre-stress value means that the support structure for supporting the glass plate against atmospheric pressure should have a higher surface density of point contacts or that the glass plate thickness should be increased.

According to the known solutions, tempered glass plates for vacuum solar thermal panels are chosen to be thick enough for the stress induced by the mechanical deformation due to atmospheric pressure to remain below one half the pre-stress level induced by the tempering process even after any reduction due to the frit firing cycle takes place.

Alternatively, the temper induced pre-stress can be increased by using chemical instead of thermal tempering process or the density of point contacts of the support structure can be increased to reduce the stress induced by the mechanical deformation due to atmospheric pressure.

More in particular, significant reduction in pre-stress level cannot be acceptable for vacuum solar thermal panels making use of thin glass plates (less than 5 mm) and lightweight support structure.

For instance, in the case of a vacuum solar thermal panel making use of a 4 mm thick float glass plate and a support structure with equally spaced point contacts, separated by 100 mm pitch, a reduction of more than 30% from an initial thermal tempering induced pre-stress of about 120 MPa would not be compatible with the stress due to the deformation caused by the atmospheric pressure, which exceeds 60 MPa.

Therefore, a support structure with higher density of contact points should be used, adding more weight to the panel and increasing its cost. Also, the chemical tempering processes, which alternatively allow reaching much higher values of pre-stress, are often limited in maximum glass plate dimensions, since they make use of tanks for holding the required chemicals and in any case are much more expensive than standard thermal tempering processes.

According to WO 2010/003653, a method for constructing vacuum solar thermal panels is described, which employs a frit firing cycle peaking at 450° C. for 30 minutes.

However, it can be verified that conventional heating processes for such firing frit cycle would decrease significantly the pre-stress level of the glass plate and therefore would pose specific threats to the glass plate integrity under atmospheric pressure, unless specific measures are taken as above indicated, for instance by increasing the pre-stress level by means of chemical tempering or by increasing glass thickness and/or by increasing the surface density of the point contacts of the support structure.

Document U.S. Pat. No. 5,668,494 discloses a method for manufacturing a vacuum insulated glass wherein a glass-glass seal is realized by selectively heating, via microwave radiations, the peripheral edge of two glasses. However, this document does not pertain to the technical field of the invention and it provides no teaching on how to perform glass-metal seals. A person skilled in the art would not employ microwaves on a glass-metal seal, since eddy currents generated in the metal may cause the frame to overheat.

The technical problem underlying the present invention is that of providing a manufacturing method for a vacuum solar thermal panel in which the frit firing cycle forming the glass-metal seal does not decrease the pre-stress level of the glass plate, in this way overcoming the limits which still affect the methods realised according to the prior art.

SUMMARY OF THE INVENTION

The solution idea underlying the present invention is that of performing a frit firing cycle in the manufacturing of a vacuum solar thermal panel in which the temperature of a tempered glass plate portion at a melting area thereof is kept at a higher temperature than the remaining portions of the tempered glass plate by means of selective heating of that area.

On the basis of such solution idea the technical problem is solved by a method for manufacturing a vacuum solar thermal panel which comprises at least a tempered glass plate and a metal frame attached to said plate, the method comprising a frit firing cycle in order to form a glass-metal seal between the tempered glass plate and the metal frame, such a frit firing cycle comprising: a heating phase of the tempered glass plate up to a maximum temperature, that preserves a suitable pre-stress level of the tempered glass plate, and a further heating phase being a selective heating phase of a melting area of the tempered glass plate performed at a second temperature which is greater than the maximum temperature. The selective heating phase comprises an illumination phase of said tempered glass plate with light, including infrared light.

Preferably, the light employed in the illumination phase is infrared radiation (named "IR light" in the following) Advantageously, said second temperature is between 350 and 650° C., preferably 450° C.

Moreover, said selective heating phase is performed concurrently with said first heating phase.

More specifically, the selective heating phase relates to the perimeter edge of the tempered glass plate.

Advantageously, the light illuminates only the melting area of the glass plate thanks to a suitable shadow mask.

The first heating phase is performed in an oven up to said maximum temperature.

The characteristics and advantages of the method according to the invention will be apparent from the following description given by way of non-limiting example with reference to the enclosed drawings.

DETAILED DESCRIPTION

The present invention relates to a method for manufacturing a vacuum solar thermal panel.

Figure 4:
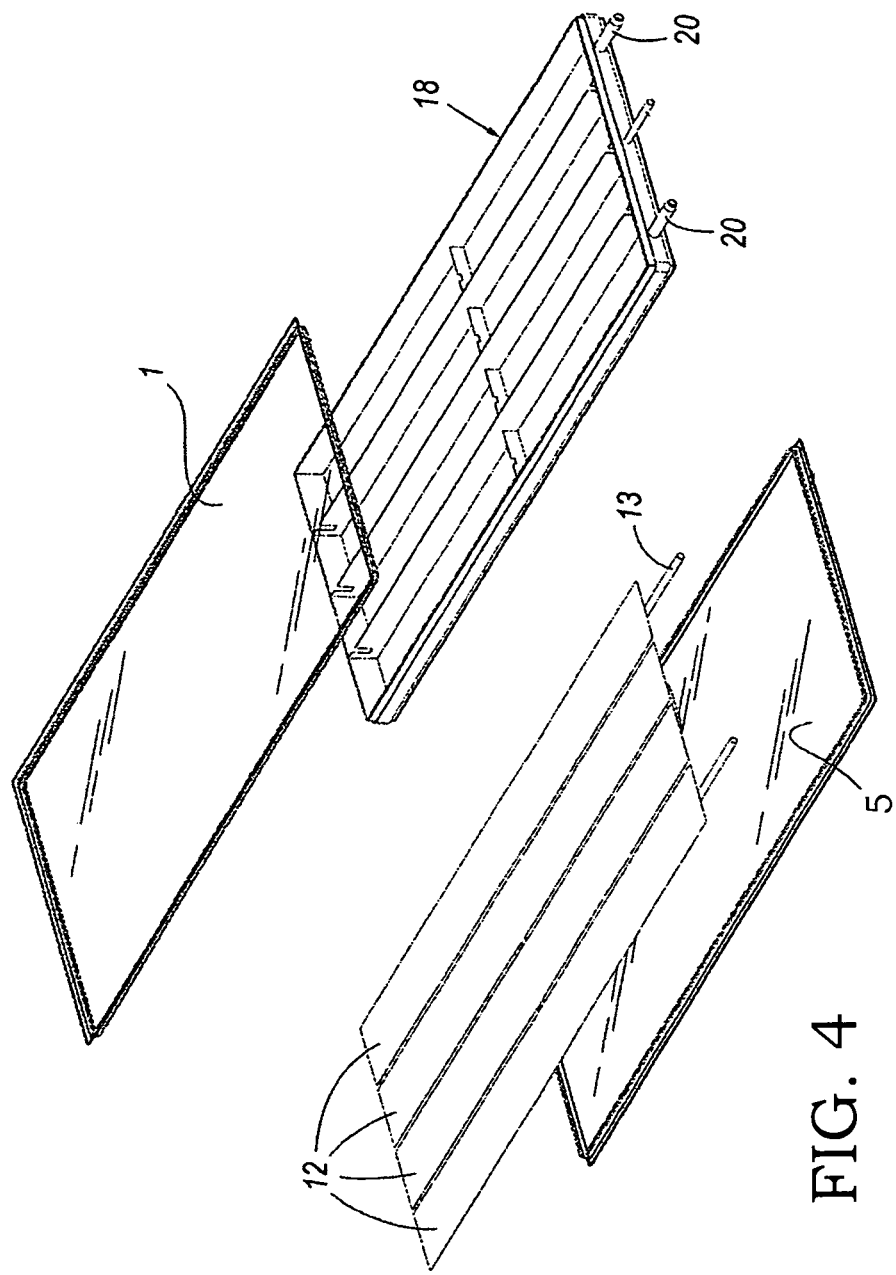
FIG. 4 shows an exploded view of a vacuum solar thermal panel obtained with the method of the present invention.

FIG. 4 shows an exploded view of an exemplary vacuum solar thermal panel obtained by means of the present invention.

The vacuum solar thermal panel comprises a vacuum envelope defining a sealed volume, able to withstand atmospheric pressure when evacuated, comprising a tempered glass plate 1, which is transparent to the visible solar radiation. The vacuum envelope is completed by a peripheral metal frame 18 and by a back glass plate 5.

A pipe 13 for a thermal fluid with attached multiple heat absorbers 12 is enclosed in the vacuum envelope. Said pipe 13 enters and exits the vacuum envelope through the exit ports 20.

Figure 5:
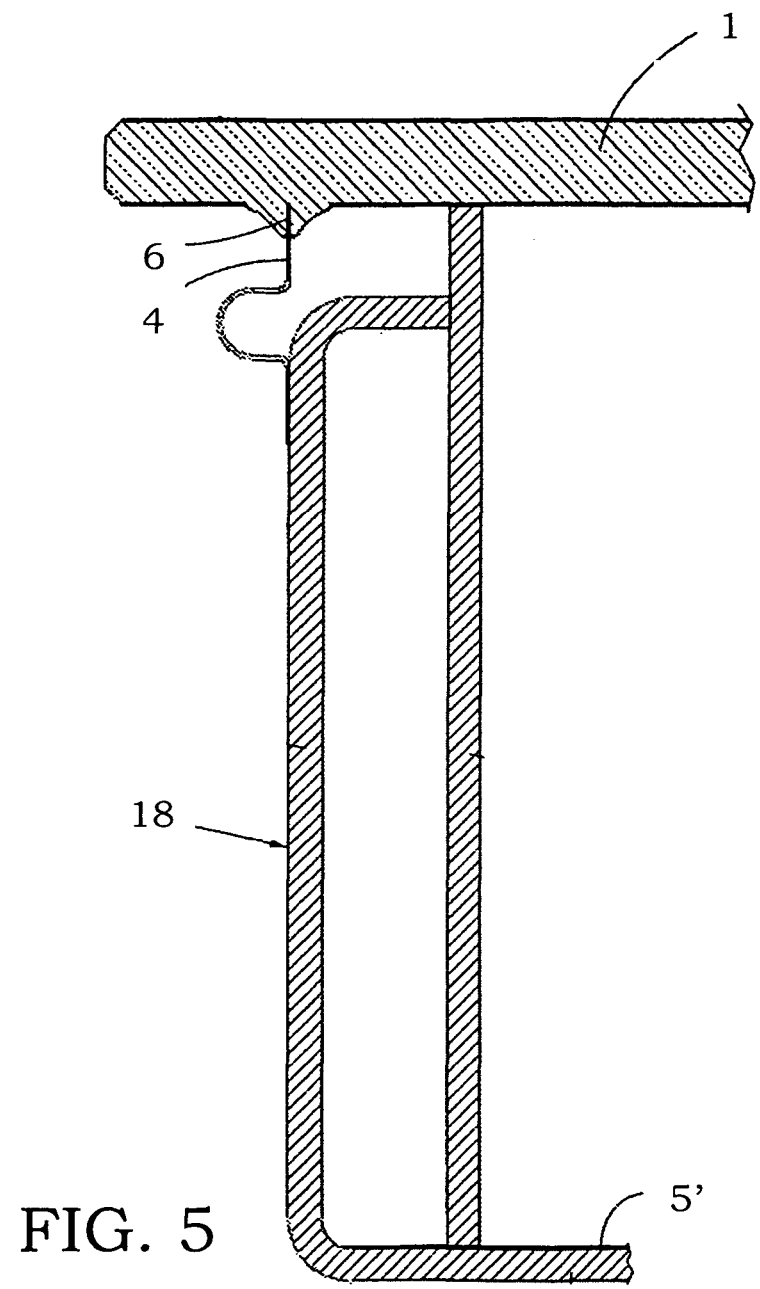
FIG. 5 shows a cross-sectioned detail of a glass-metal seal of a vacuum solar thermal panel, different from the one in FIG. 4, obtained with the method of the present invention.

FIG. 5 details an example of a vacuum-tight glass-metal seal 6 connecting a peripheral metal belt 4 of the metal frame 18 to the tempered glass plate 1. The vacuum solar panel shown in this figure, unlike the one shown in FIG. 4, features a metal back plate 5' which is integral with the metal frame 18.

The present manufacturing method comprises a frit firing cycle in which the temperature of the tempered glass plate at a melting area thereof is kept at a higher temperature than the rest of the tempered glass plate by means of selective heating of this area. In particular, in a preferred embodiment of the invention, the melting area is a perimeter edge of the tempered glass plate, where frit melting occurs. The frit melting forms the glass-metal seal 6 between the tempered glass plate 1 and the metal frame 18 attached to the plate. More in particular, the method comprises an initial heating phase of the tempered glass plate 1 up to a maximum temperature Tm. Such a temperature preserves a suitable pre-stress level of the tempered glass plate 1.

According to an aspect of the invention, the method also comprises a further heating phase, in particular a selective heating phase of a melting area of the tempered glass plate, this selective heating phase being performed at a second temperature Th which is greater than the maximum temperature Tm.

This second temperature Th is between 350 and 650, preferably 450° C.

In this way, the maximum temperature Tm of the first heating phase can be reduced with respect to the known methods, in order to not significantly decrease the pre-stress of the tempered glass plate. The decreased maximum temperature Tm of the first heating phase being between 200 and 300° C.

According to a preferred aspect of the invention, the melting area is a perimeter edge of the tempered glass plate, where frit melting occurs and the glass-metal seal 6 is formed.

Moreover, according to another aspect of the invention, the selective heating phase is performed concurrently with the first heating phase.

In particular, a selective heating of the tempered glass plate 1 is achieved by an illumination phase performed inside the oven with the light using a shadow mask all inside the melting area.

Heat lamps known in the art can be employed in order to perform said illumination phase.

In a preferred embodiment of the present invention, an IR lamp is employed to perform the illumination, the light employed being then IR light.

Figure 1:
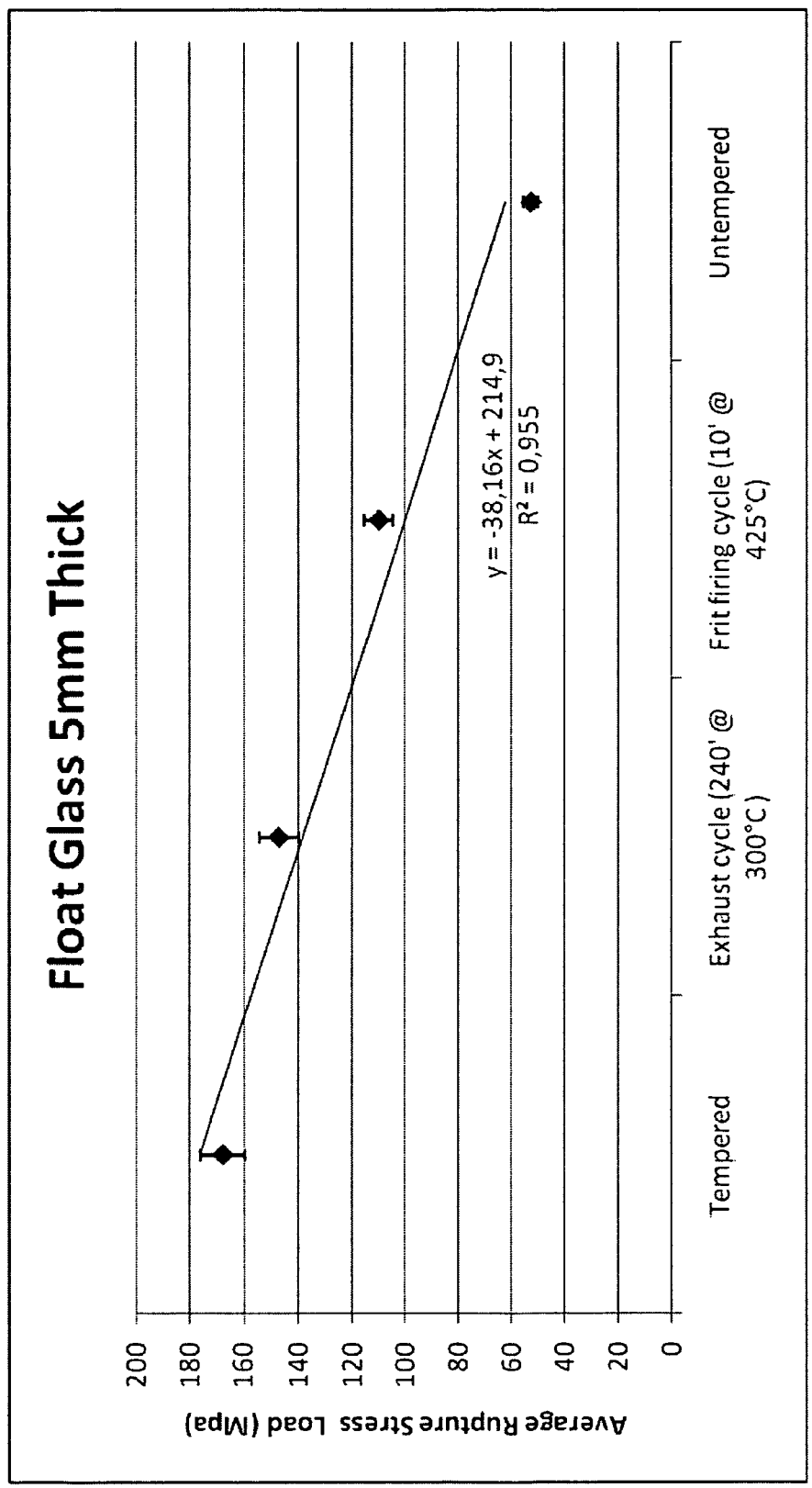
FIGS. 1 and 2 schematically show in diagram form the results of experiments carried out by the applicant,
FIG. 3 schematically shows a thermal panel undergoing to a frit firing cycle according to an embodiment of the invention.
Figure 2:
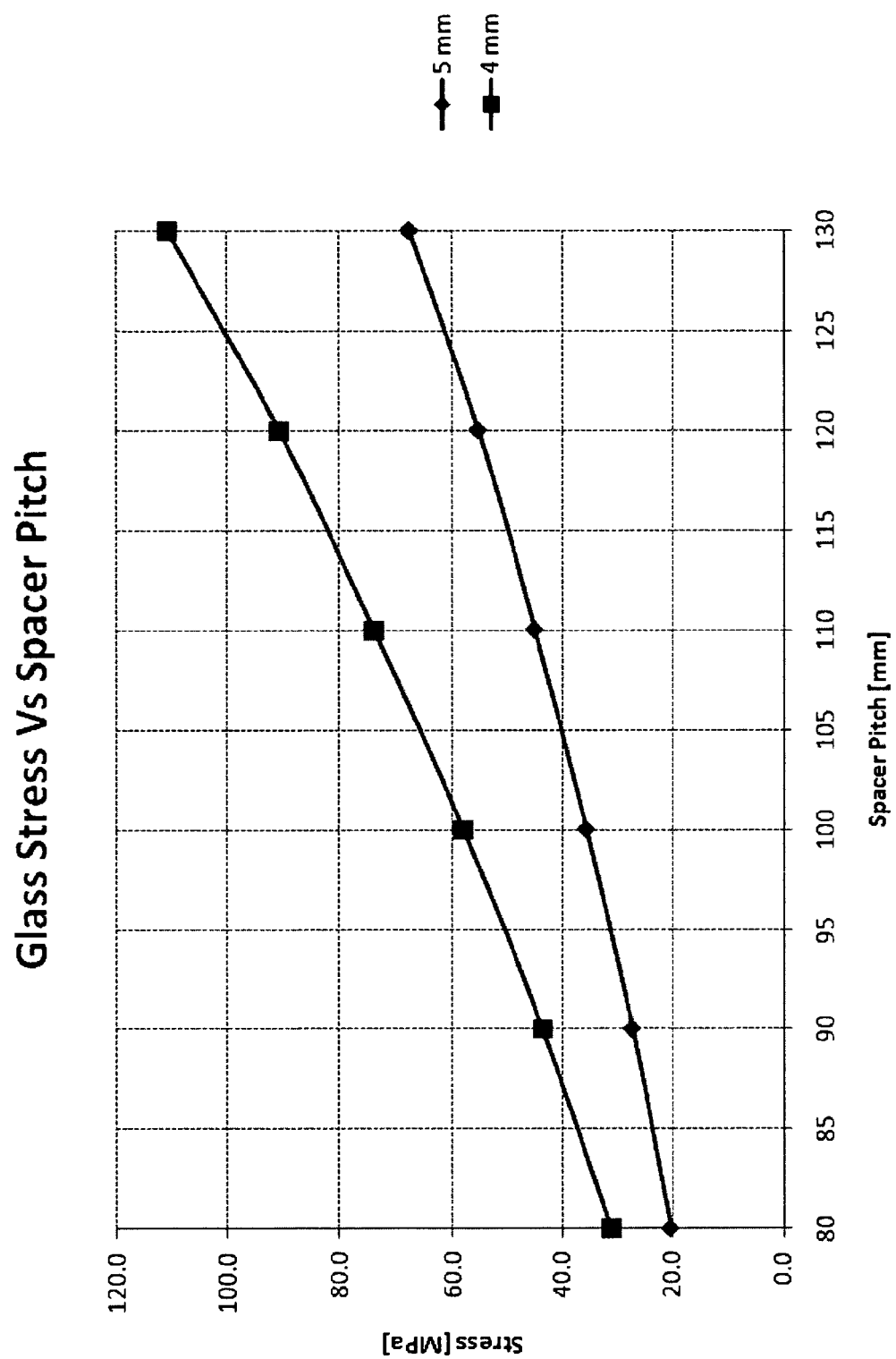
Figure 3:
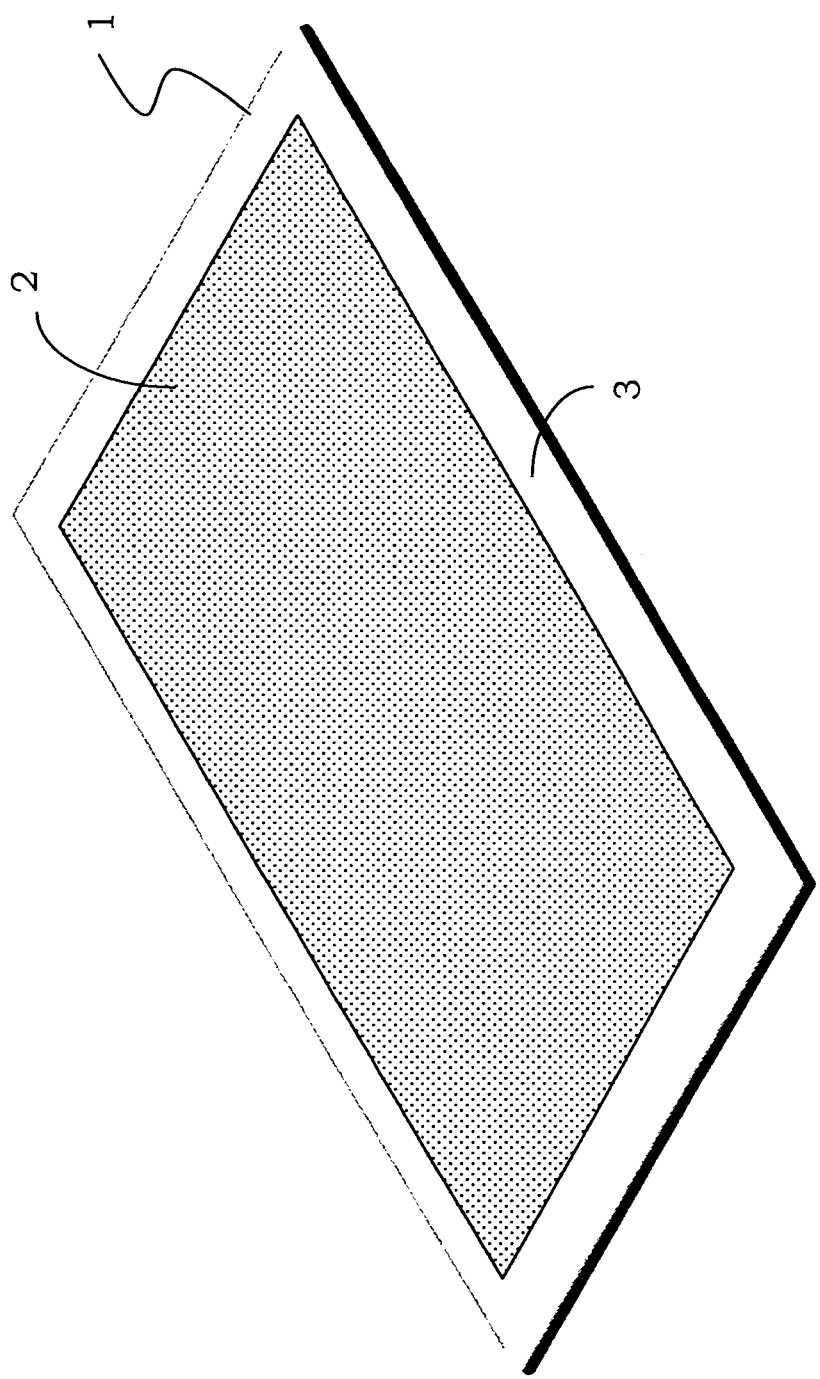

In particular, as schematically shown in FIG. 3, the thermal panel comprising the tempered glass plate 1 and the metal frame not shown in the figure is partially covered by a shadow mask 2, which leaves an unshielded portion 3 corresponding to the perimeter edge of the tempered glass plate. The IR light then illuminates only the unshielded portion 3 of the tempered glass plate 1 uncovered by the shadow mask 2, in particular the perimeter edge, increasing its temperature.

In this way, a frit fired tempered glass plate for a vacuum solar thermal panel is obtained which shows a small reduction of its pre-stress level because of the frit firing cycle. Hence, the method of the present invention, allows using limited thickness glass plates, in particular 4 mm thick glass plates, without any concern due to the reduction of pre-stress level because of frit firing cycle. According to the present invention, it is no longer required to increase the thickness of the glass plate. Moreover, it is no longer required to increase the surface density of the contact points of the support structure.

Obviously, a technician of the field, aiming at meeting incidental and specific needs, will bring several modifications to the above described method, all within the scope of protection of the invention as defined by the following claims.

The invention claimed is:

1. A method for manufacturing a vacuum solar thermal panel,
wherein said vacuum solar thermal panel comprises at least a tempered glass plate and a metal frame attached to said tempered glass plate;
the method comprising:
providing a metal frame and a tempered glass plate;
setting the metal frame and the tempered glass plate in a final relative position in which they can be attached together by a glass-metal seal;
after setting the metal frame and the tempered glass plate in the final relative position, performing a frit firing cycle in order to form a glass-metal seal between the tempered glass plate and the metal frame, said frit firing cycle comprising:
a first heating phase, performed after setting the metal frame and the tempered glass plate in their final relative position, of the tempered glass plate up to a maximum temperature (Tm), that preserves a suitable pre-stress level of the tempered glass plate;
a further heating phase, performed after setting the metal frame and the tempered glass plate in their final relative position, said further heating phase being a selective heating phase of a melting area of the tempered glass plate performed at a second temperature (Th) which is greater than the maximum temperature (Tm), so that the temperature of a tempered glass plate portion at the melting area is kept higher than the temperature of the remaining portions of the tempered glass plate, said selective heating phase comprising:
an illumination phase of said tempered glass plate with light, wherein the light employed in said illumination phase is infrared light.

2. The method according to claim 1, wherein said second temperature (Th) is between 350 and 650.

3. The method according to claim 1, wherein said selective heating phase is performed concurrently with said first heating phase.

4. The method according to claim 1 wherein said light illuminates only said melting area of the tempered glass plate by means of a suitable shadow mask.

5. The method according to claim 1, wherein said first heating phase is performed in an oven up to said maximum temperature.

6. The method according to claim 2, wherein said second temperature (Th) is 450° C.

7. The method according to claim 1, wherein during said first heating phase both the tempered glass plate and the metal frame are heated.

8. The method according to claim 7, said maximum temperature (Tm) being between 200 and 300° C.

9. The method according to claim 1, wherein said illumination phase is performed with heat lamps.

* * * * *